H. A. WITHINGTON.
PUZZLE.
APPLICATION FILED JULY 3, 1918.

1,282,513.

Patented Oct. 22, 1918.

Inventor,
Henry A. Withington
by Roberts Roberts Cushman
his Attorneys

UNITED STATES PATENT OFFICE.

HENRY A. WITHINGTON, OF SOMERVILLE, MASSACHUSETTS.

PUZZLE.

1,282,513.  Specification of Letters Patent.  Patented Oct. 22, 1918.

Application filed July 3, 1918. Serial No. 243,127.

*To all whom it may concern:*

Be it known that I, HENRY A. WITHINGTON, a citizen of the United States of America, and resident of Somerville, in the county of Middlesex and State of Massachusetts, have invented new and useful Improvements in Puzzles, of which the following is a specification.

This invention relates to puzzles and more particularly to a puzzle comprising a sentence one word of which is omitted and a plurality of letters adapted to form the omitted word when arranged in the proper sequence. In a more specific aspect the invention comprises a puzzle having a plurality of sentences certain words of which are omitted, each word being different but being formed by the same letters, and having the proper letters to form the various words when arranged in different sequences so as to complete the different sentences.

For the purpose of illustrating the invention I have shown a specific embodiment thereof in the accompanying drawings, in which—

In its broader aspect the present invention comprises a member having a part of a sentence thereon, a part of the sentence being left blank, and members adapted to fit into the blank spaces, the latter members having letters thereon adapted to complete the sentence when arranged in the proper sequence. In a more specific aspect the puzzle comprises a member having parts of a plurality of sentences thereon, a word being omitted from each of the various sentences, each omitted word being different but being formed of the same letters, and members adapted to fit into the blank spaces in the various sentences, the latter members having letters thereon adapted to form the various omitted words when arranged in different sequences.

The sentences may be printed or engraved or otherwise formed on the supporting member and the letters employed to complete the omitted words may be formed in any suitable way or mounted on any suitable supports. However, I prefer to mount or form the letters on blocks and to provide openings or recesses in the member bearing the sentences adapted to receive the respective blocks and hold them in position. When employing a plurality of sentences having a plurality of words omitted, each word being formed of the same number of letters all of the recesses or openings at the blank spaces are of the same size and the group of blocks forming the respective words fit into the respective recesses or openings.

Figure 1:
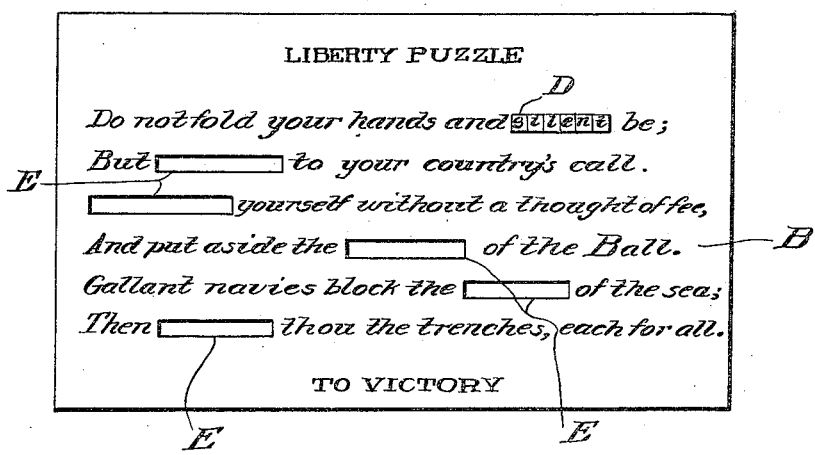
Figure 1 is a plan view of the puzzle.
Figure 2:
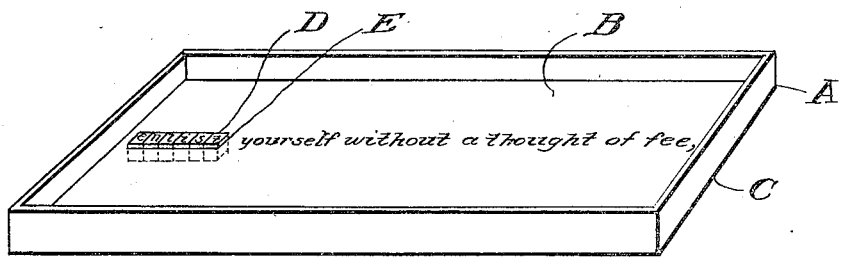
Fig. 2 is a perspective view of the puzzle, parts of the sentences being omitted.
Figure 3:
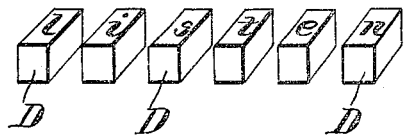
Fig. 3 is a perspective view of a plurality of blocks bearing letters on the upper faces adapted to complete the sentences.

The particular embodiment of the invention chosen for the purpose of illustration comprises a box A having a partition B mounted therein in parallelism with the bottom C and in slightly spaced relationship to said bottom. The partition B may be secured in the box in any suitable manner, as for example by being glued to the walls of the box. The partition B has printed thereon a plurality of sentences as shown in Fig. 1. A word is omitted from each line of these sentences and in the blank space a slot E is formed in the partition B. A plurality of blocks D are provided, each block having a letter formed on its upper face. The blocks are so shaped as to fit snugly into the slots and to project slightly above the level of the partition B when resting on the bottom of the box as illustrated in Fig. 2. Each omitted word is formed of the same letters so that only one group of letters need be provided with each puzzle and so that this group of letters will accurately fit into each slot in the partition.

While I have described only one particular puzzle embodying the present invention it will be understood that the novel ideas involved in the invention may be employed in many different ways.

The word "sentence" as employed herein is intended to connote a related group of words expressing a thought and not necessarily to mean a related group of words containing a subject and a predicate with their modifiers expressing a complete thought.

I claim:

1. A puzzle comprising a member having a part of a sentence thereon, a part of the sentence being left blank, and members adapted to fit into the blank space, said members having thereon letters adapted to complete the sentence when the members are arranged in the proper sequence.

2. A puzzle comprising a member having parts of one or more sentences thereon, parts of the sentences being left blank, and members adapted to fit into the blank spaces, said members having letters thereon adapted to complete the various blank parts of the sentences when arranged in different sequences.

3. A puzzle comprising a member having parts of one or more sentences thereon, certain words being omitted from the sentences to form blank spaces, each omitted word being different but being formed of the same letters, and members adapted to fit into the blank spaces, said members having letters thereon adapted to form the various omitted words.

4. A puzzle comprising a member having a part of a sentence thereon, a part of the sentence being left blank, said member having a recess therein at said blank part of the sentence, and members adapted to fit into said recess, said members having letters thereon adapted to complete the sentence when the members are arranged in the proper sequence.

5. A puzzle comprising a sheet having a part of a sentence thereon, a part of the sentence being left blank, said sheet having a slot therein at said blank part of the sentence, and members adapted to fit into said slot, said members having letters thereon adapted to complete the sentence when the members are arranged in the proper sequence.

6. A puzzle comprising a box, a partition in the box substantially parallel with and slightly spaced from the bottom of the box, said partition having a part of a sentence thereon, a part of the sentence being left blank, said partition having a slot therein at said blank part of the sentence, and blocks adapted to fit into said slot and rest on the bottom of the box with their upper faces projecting slightly above said partition, said blocks having letters thereon adapted to complete the sentence when the blocks are arranged in the proper sequence in the slots.

Signed by me at Boston, Massachusetts, this 26th day of June, 1918.

HENRY A. WITHINGTON.

Copies of this patent may be obtained for five cents each, by addressing the "Commissioner of Patents, Washington, D. C."